US012260811B2

(12) United States Patent
Wu et al.

(10) Patent No.: US 12,260,811 B2
(45) Date of Patent: Mar. 25, 2025

(54) MICRO-LED DISPLAY AND OPERATION METHOD THEREOF

(71) Applicant: AUO Corporation, Hsin-Chu (TW)

(72) Inventors: Yang-En Wu, Hsin-Chu (TW); Sheng-Wen Cheng, Hsin-Chu (TW); Jen-Lang Tung, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/533,309

(22) Filed: Dec. 8, 2023

(65) Prior Publication Data

US 2025/0006107 A1 Jan. 2, 2025

(30) Foreign Application Priority Data

Jun. 30, 2023 (TW) ................................ 112124593

(51) Int. Cl.
*G09G 3/32* (2016.01)

(52) U.S. Cl.
CPC ....... *G09G 3/32* (2013.01); *G09G 2300/0452* (2013.01); *G09G 2320/062* (2013.01)

(58) Field of Classification Search
CPC ............. G09G 3/32; G09G 2300/0452; G09G 2320/062; H01L 25/13; G02B 5/201; H10K 59/351
USPC ........................................................ 345/694
See application file for complete search history.

(56) References Cited

U.S. PATENT DOCUMENTS

2006/0044226 A1 3/2006 Liedenbaum et al.
2006/0098033 A1 * 5/2006 Langendijk ............ G02B 5/201 345/694
2006/0158454 A1 7/2006 Heynderickx et al.
2009/0141381 A1 6/2009 Itou et al.
2022/0398987 A1 * 12/2022 Wyatt .................. H10K 59/351
2023/0196965 A1 * 6/2023 Schrama ................ H01L 25/13 345/694

* cited by examiner

*Primary Examiner* — Abdul-Samad A Adediran
(74) *Attorney, Agent, or Firm* — WPAT, PC

(57) ABSTRACT

A micro-LED display includes a first LED subpixel, a second LED subpixel, a third LED subpixel and a fourth LED subpixel. The first LED subpixel is configured to emit a red light. The second LED subpixel is configured to emit a green light. The third LED subpixel is configured to emit a blue light. The fourth LED subpixel is configured to emit a yellow light, in which the yellow light emitted by the fourth LED subpixel has a peak wavelength that satisfies $\lambda_{p,Yellow,lower\_limit}<\lambda_p$. $\lambda_{p,Yellow,lower\_limit}$ is a lower limit of the peak wavelength of the yellow light, $\lambda_p$ is the peak wavelength of the yellow light.

15 Claims, 6 Drawing Sheets

MICRO-LED DISPLAY AND OPERATION METHOD THEREOF

RELATED APPLICATIONS

This application claims priority to Taiwan Application Serial Number 112124593, filed Jun. 30, 2023, which is herein incorporated by reference.

BACKGROUND

Field of Invention

The present disclosure relates to a micro-LED display and an operation method of the micro-LED display.

Description of Related Art

Micro-LED (light-emitting diode) display nowadays are mostly using red LED, green LED and blue LED to display most of the colors, since the peak wavelength of the three colors covers enough range on the International Commission on Illumination (CIE) 1931 chromaticity diagram. The three colors (red, green and blue) can display most of the colors using light blending, so they're commonly used in the field of display.

However, due to the lower efficiency of the red LED nowadays, when emitting a whit balance light, the red LED will use a large amount of the power consume of the display. Therefore, a light emitting mode of reducing the power consume is a desire need.

SUMMARY

One aspect of the present disclosure provides a micro-LED display.

According to one embodiment of the present disclosure, a micro-LED display includes a first LED subpixel, a second LED subpixel, a third LED subpixel and a fourth LED subpixel. The first LED subpixel is configured to emit a red light. The second LED subpixel is configured to emit a green light. The third LED subpixel is configured to emit a blue light. The fourth LED subpixel is configured to emit a yellow light, in which the yellow light emitted by the fourth LED subpixel has a peak wavelength that satisfies $\lambda_{p,Yellow,lower\_limit}<\lambda_p$. $\lambda_{p,Yellow,lower\_limit}$ is a lower limit of the peak wavelength of the yellow light, $\lambda_p$ is the peak wavelength of the yellow light. The lower limit of the peak wavelength of the yellow light is a wavelength value of an intersection point of a connection line between a blue point and a white balance point and a spectral locus of an International Commission on Illumination (CIE) 1931 chromaticity diagram. The blue point corresponds to the blue light emitted by the third LED subpixel, and a wavelength value of the intersection point is in a range of 560 nanometers to 580 nanometers.

In some embodiments of the present disclosure, the peak wavelength of the yellow light emitted by the fourth LED subpixel has an upper limit. The upper limit is a peak wavelength of a red point on the CIE 1931 chromaticity diagram that corresponds to the red light emitted by the first LED subpixel.

In some embodiments of the present disclosure, the micro-LED display has a first light emitting mode. Only the second LED subpixel, the third LED subpixel and the fourth LED subpixel are lit in the first light emitting mode.

In some embodiments of the present disclosure, the micro-LED display has a second light emitting mode. Only the first LED subpixel, the second LED subpixel and the third LED subpixel are lit in the second light emitting mode.

In some embodiments of the present disclosure, the micro-LED display has a third light emitting mode. The first LED subpixel, the second LED subpixel, the third LED subpixel and the fourth LED subpixel are lit in the third light emitting mode.

In some embodiments of the present disclosure, a first brightness of the fourth LED subpixel is greater than a second brightness of the second LED subpixel in the first light emitting mode.

In some embodiments of the present disclosure, the first brightness is greater than 1.5 times of the second brightness.

In some embodiments of the present disclosure, the first brightness of the fourth LED subpixel is greater than a third brightness of the third LED subpixel in the first light emitting mode.

In some embodiments of the present disclosure, a yellow point on the CIE 1931 chromaticity diagram that corresponds to the yellow light emitted by the fourth LED subpixel is located on a connection line between a red point and a green point on the CIE 1931 chromaticity diagram. The red point corresponds to the red light emitted by the first LED subpixel, and the green point corresponds to the green light emitted by the second LED subpixel.

Another aspect of the present disclosure provides an operation method of a micro-LED display.

According to one embodiment of the present disclosure, an operation method of a micro-LED display includes selecting one of a first light emitting mode, a second light emitting mode and a third light emitting mode; and emitting a white balance light with a first LED subpixel, a second LED subpixel, a third LED subpixel and a fourth LED subpixel, in which the first LED subpixel emits a red light, the second LED subpixel emits a green light, the third LED subpixel emits a blue light, and the fourth LED subpixel emits a yellow light. Only the second LED subpixel, the third LED subpixel and the fourth LED subpixel are lit in the first light emitting mode. Only the first LED subpixel, the second LED subpixel and the third LED subpixel are lit in the second light emitting mode. The first LED subpixel, the second LED subpixel, the third LED subpixel and the fourth LED subpixel are lit in the third light emitting mode.

In some embodiments of the present disclosure, the yellow light emitted by the fourth LED subpixel has a peak wavelength that satisfies $\lambda_{p,Yellow,lower\_limit}<\lambda_p$, in which $\lambda_{p,Yellow,lower\_limit}$ is a lower limit of the peak wavelength of the yellow light, $\lambda_p$ is the peak wavelength of the yellow light. The lower limit of the peak wavelength of the yellow light is a wavelength value of an intersection point of a connection line between a blue point and a white balance point and a spectral locus of an International Commission on Illumination (CIE) 1931 chromaticity diagram. The blue point corresponds to the blue light emitted by the third LED subpixel. The white balance point corresponds to the white balance light. The wavelength value of the intersection point is in a range of 560 nanometers to 580 nanometers.

In some embodiments of the present disclosure, the peak wavelength has an upper limit. The upper limit is a peak wavelength of a red point on the CIE 1931 chromaticity diagram that corresponds to the red light emitted by the first LED subpixel.

In some embodiments of the present disclosure, a first brightness of the fourth LED subpixel is greater than a second brightness of the second LED subpixel.

In some embodiments of the present disclosure, the first brightness is greater than 1.5 times of the second brightness.

In some embodiments of the present disclosure, a first brightness of the fourth LED subpixel is greater than a third brightness of the third LED subpixel in the first light emitting mode.

In the aforementioned embodiments of the present disclosure, since the fourth LED subpixel emit a yellow light and the yellow LED has a greater light emitting efficiency than the red LED, the white balance point created by the green light of the second LED subpixel, the blue light of the third LED subpixel and the yellow light of the fourth LED subpixel can save 40 percent of the power consume in the white balance mode, which is a significant effect on reducing the power consumption of the display.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
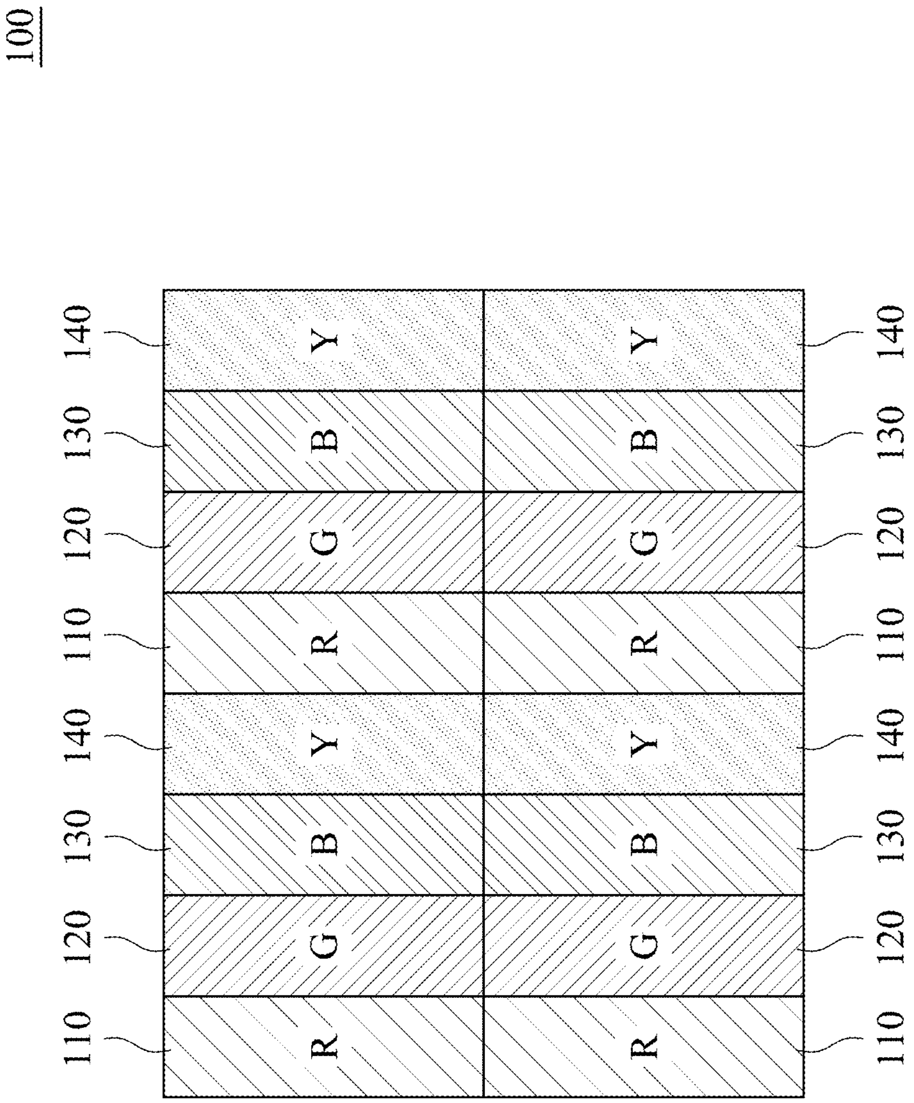
FIG. 1 is a schematic view of a micro-LED display according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
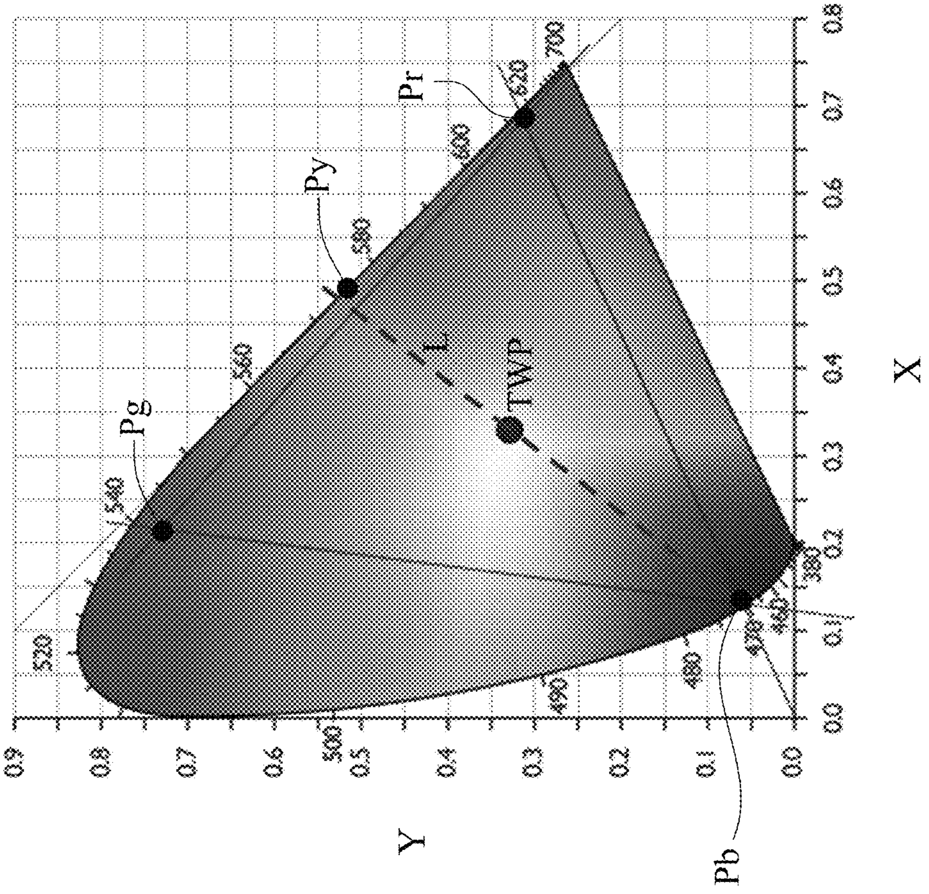
FIG. 2 is a schematic view of the range of the wavelength of the yellow light of the micro-LED display on the CIE 1931 chromaticity diagram according to one embodiment of the present disclosure.

FIG. 1 is a schematic view of a micro-LED display 100 according to one embodiment of the present disclosure. FIG. 2 is a schematic view of the range of the wavelength of the yellow light of the micro-LED display 100 on the CIE 1931 chromaticity diagram according to one embodiment of the present disclosure. Refer to FIG. 1 and FIG. 2, a micro-LED display 100 includes a first LED subpixel 110, a second LED subpixel 120, a third LED subpixel 130 and a fourth LED subpixel 140. The first LED subpixel 110 is configured to emit a red light. The second LED subpixel 120 is configured to emit a green light. The third LED subpixel 130 is configured to emit a blue light. The fourth LED subpixel 140 is configured to emit a yellow light, in which the yellow light emitted by the fourth LED subpixel 140 has a peak wavelength that satisfies $\lambda_{p,Yellow,lower\_limit} < \lambda_p$. $\lambda_{p,Yellow,lower\_limit}$ is a lower limit of the peak wavelength of the yellow light, $\lambda_p$ is the peak wavelength of the yellow light. The lower limit of the peak wavelength of the yellow light is a wavelength value of an intersection point of a connection line L between a blue point Pb and a white balance point TWP (Target White Point) and a spectral locus of an International Commission on Illumination (CIE) 1931 chromaticity diagram (such as FIG. 2). The blue point corresponds to the blue light emitted by the third LED subpixel, and a wavelength value of the intersection point is in a range of 560 nanometers to 580 nanometers. In some embodiments, the peak wavelength of the yellow light emitted by the fourth LED subpixel 140 has an upper limit. The upper limit is a peak wavelength of a red point Pr on the CIE 1931 chromaticity diagram that corresponds to the red light emitted by the first LED subpixel 110. The reason to define the lower and the upper limit of the peak wavelength of the yellow light is that, in order to blend the color represented by the white balance point TWP through light blending, the triangle formed by the yellow point Py that corresponds to the yellow light emitted by the fourth LED subpixel 140, the green point Pg that corresponds to the green light emitted by the second LED subpixel 120 and the blue point Pb that corresponds to the blue light emitted by the third LED subpixel 130 must cover the white balance point TWP that corresponds to the white balance light on the CIE 1931 chromaticity diagram. In some embodiments, the wavelength of the yellow light emitted by the fourth LED subpixel 140 is in a range of 575 nanometers to 580 nanometers.

Figure 3:
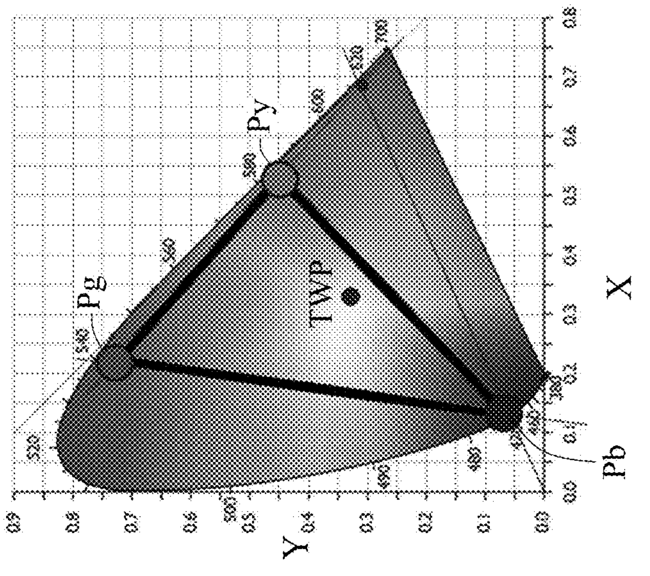
FIG. 3 to FIG. 5 are schematic views of the ranges covered on the CIE 1931 chromaticity diagram in different light emitting modes of the micro-LED display.
Figure 4:
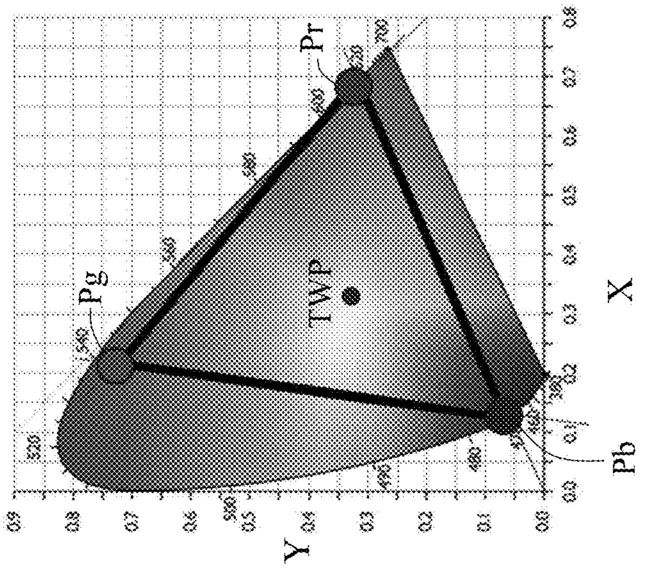
Figure 5:
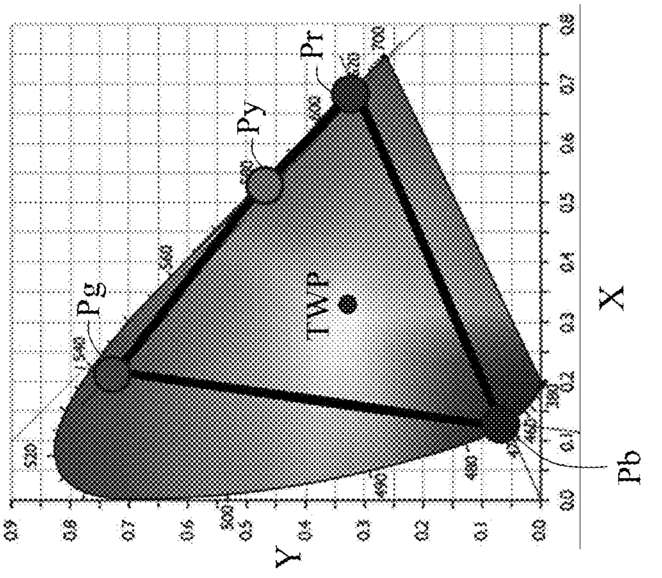

FIG. 3 to FIG. 5 are schematic views of the ranges covered on the CIE 1931 chromaticity diagram in different light emitting modes of the micro-LED display 100 (see FIG. 1). Refer to FIG. 1, FIG. 3, FIG. 4 and FIG. 5. The micro-LED 100 has a first light emitting mode. Only the second LED subpixel 120, the third LED subpixel 130 and the fourth LED subpixel 140 are lit in the first light emitting mode. The coverage corresponds to the first light emitting mode on the CIE 1931 chromaticity diagram is the coverage of the bold triangle of FIG. 3. The first light emitting mode can be referred to as a power saving mode. Moreover, the micro-LED display 100 has a second light emitting mode. Only the first LED subpixel 110, the second LED subpixel 120 and the third LED subpixel 130 are lit in the second light emitting mode. The coverage corresponds to the second light emitting mode on the CIE 1931 chromaticity diagram is the coverage of the bold triangle of FIG. 4. The coverage of the color that the second light emitting mode can display is greater than the coverage of the color that the first light emitting mode can display (represented as the area of the two bold triangles on the two CIE 1931 chromaticity diagram). The first light emitting mode, however, has the effect of power saving. Table 1 shows the coordination on the CIE 1931 chromaticity diagram, brightness and the power consumption with respect to the second light emitting mode of the first light emitting mode and the second light emitting mode:

TABLE 1

| | | second light emitting mode | first light emitting mode (575 nm yellow light wavelength) | first light emitting mode (580 nm yellow light wavelength) |
|---|---|---|---|---|
| first LED | x | 0.692 | Not lit | Not lit |
| subpixel | y | 0.307 | Not lit | Not lit |
| | Y | 24.1 | Not lit | Not lit |
| second LED | x | 0.211 | 0.211 | 0.211 |
| subpixel | y | 0.735 | 0.735 | 0.735 |
| | Y | 70.2 | 19.8 | 30.6 |
| third LED | x | 0.137 | 0.137 | 0.137 |
| subpixel | y | 0.047 | 0.047 | 0.047 |
| | Y | 5.7 | 5.9 | 5.8 |
| fourth LED | x | Not lit | 0.480 | 0.500 |
| subpixel | y | Not lit | 0.520 | 0.490 |
| | Y | Not lit | 74.3 | 63.7 |
| White | x | 0.309 | 0.309 | 0.308 |
| balance point | y | 0.339 | 0.338 | 0.340 |
| | Y | 100 | 100 | 100 |
| power consumption (let second light emitting mode to be 100%) | | 100% | 58% | 58% |

As shown in table 1, the first light emitting mode that using the fourth LED subpixel 140 to replace the first LED subpixel 110 can save about 40 percent of the power consumption, and the coordination and the brightness of the white balance point don't have too much difference. This is because that the luminous efficacy of the yellow LED is greater than the luminous efficacy of the red LED, such that the yellow LED can provide higher luminance under the same current (As an example, the luminous efficacy of a red LED is about 15 cd/A, but the luminous efficacy of a yellow LED can be about 100 cd/A).

In the first light emitting mode, a first brightness of the fourth LED subpixel 140 is greater than a second brightness of the second LED subpixel 120. The first brightness is greater than 1.5 times of the second brightness. Also, the first brightness of the fourth LED subpixel 140 is greater than a third brightness of the third LED subpixel 130 in the first light emitting mode. Moreover, the micro-LED display 100 has a third light emitting mode. The first LED subpixel 110, the second LED subpixel 120, the third LED subpixel 130 and the fourth LED subpixel 140 are lit in the third light emitting mode. The coverage corresponds to the third light emitting mode on the CIE 1931 chromaticity diagram is the coverage of the bold quadrilateral of FIG. 5. The coverage of the color that the third light emitting mode can display through light blending is the largest of three light emitting modes. Also, the third light emitting mode enables the switch between lighting the first LED subpixel 110 and lighting the fourth LED subpixel 140.

Since the fourth LED subpixel emit a yellow light and the yellow LED has a greater light emitting efficiency than the red LED, the white balance point created by the green light of the second LED subpixel, the blue light of the third LED subpixel and the yellow light of the fourth LED subpixel can save 40 percent of the power consume in the white balance mode, which is a significant effect on reducing the power consumption of the display.

Figure 6:
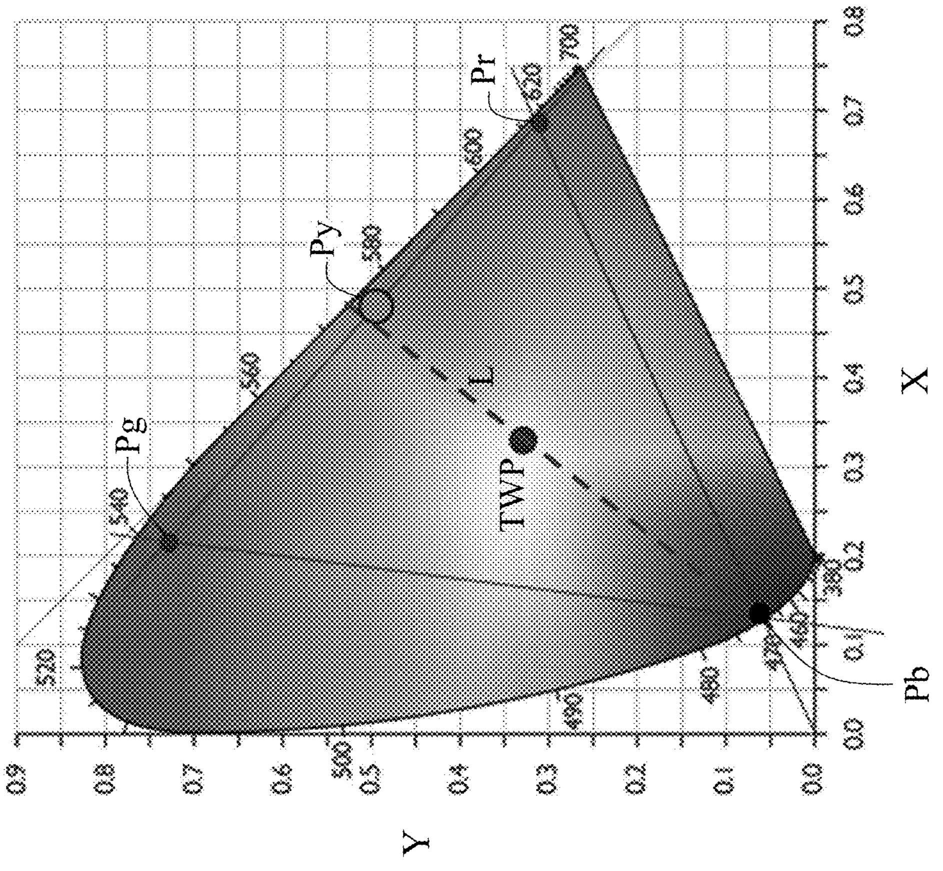
FIG. 6 is a schematic view of the range of the wavelength of the yellow light of the micro-LED display on the CIE 1931 chromaticity diagram according to another embodiment of the present disclosure.

FIG. 6 is a schematic view of the range of the wavelength of the yellow light of the micro-LED display 100 on the CIE 1931 chromaticity diagram according to another embodiment of the present disclosure. Refer to FIG. 6, in this embodiment, the peak wavelength of the yellow light is located on the intersection point of the connection line L between the blue point Pb and the white balance point TWP and the connection line between the red point Pr the green point Pg on the CIE 1931 chromaticity diagram. The blue point Pb corresponds to the blue light emitted by the third LED subpixel 130, the red point Pr corresponds to the red light emitted by the first LED subpixel 110, the green point Pg corresponds to the green light emitted by the second LED subpixel 120, and the yellow point Py on the CIE 1931 chromaticity diagram that corresponds to the yellow light emitted by the fourth LED subpixel 140 is located on the connection line between the red point Pr and the green point Pg. i.e. The (x,y) coordination of the yellow point Py on the CIE 1931 chromaticity diagram satisfy:

$$Y(x, y) = G(x, y) + kR(x, y) \qquad \text{Eq.}$$

The Equation can effectively reduce the amount of calculation of the gamut mapping algorithm that transfer the RGB gamut of the second light emitting mode into the YGB gamut of the first light emitting mode of the RGBY gamut of the third light emitting mode, such that the background algorithm of the micro-LED display 100 can be simplify.

Figure 8:
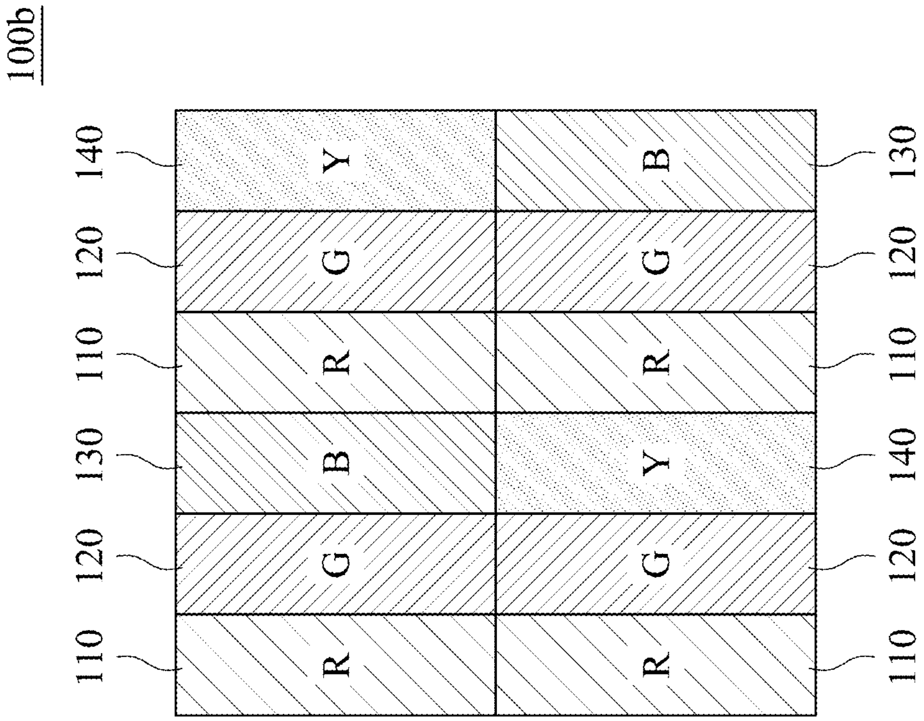
FIG. 7 and FIG. 8 are schematic views of a micro-LED display according to different embodiments of the present disclosure.
Figure 7:
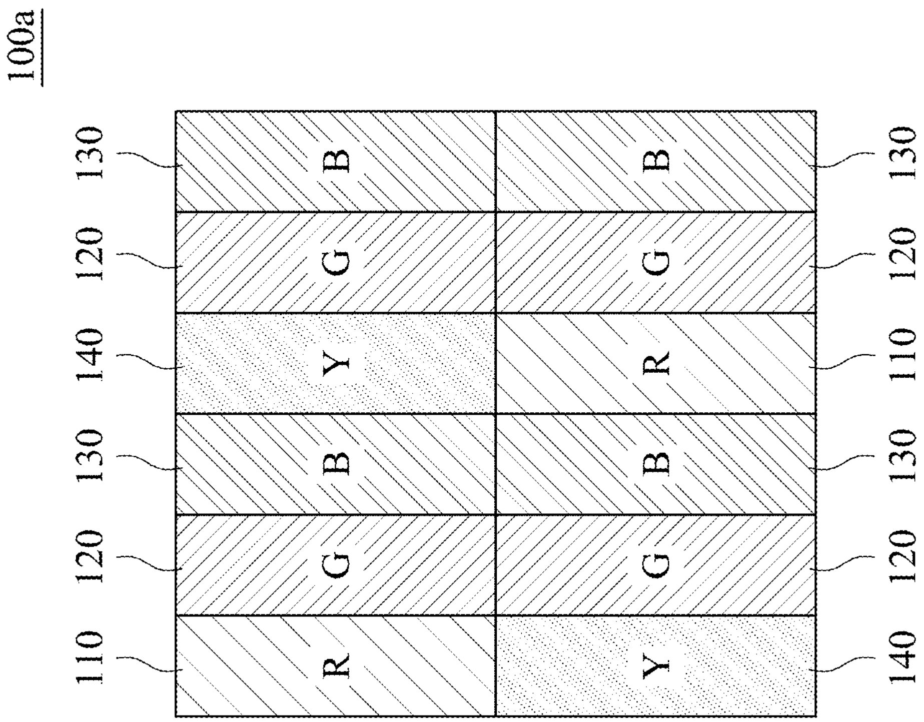

FIG. 7 and FIG. 8 are schematic views of a micro-LED display 100*a*, 100*b* according to different embodiments of the present disclosure. Refer to FIG. 7, the difference between the present embodiment and the embodiment of FIG. 1 is that a part of the pixels of the micro-LED display 100*a* is consist of the first LED subpixel 110, the second LED subpixel 120 and the third LED subpixel 130, and the other part of the pixels of the micro-LED display 100*a* is consist of the second LED subpixel 120, the third LED subpixel 130 and the fourth LED subpixel 140. Such arrangement can generate the image signal through the method of sub-pixel rendering of the algorithm of the control circuit, and therefore reaches the same effect as the embodiment of FIG. 1.

Refer to FIG. 8, the difference between the present embodiment and the embodiment of FIG. 1 is that a part of the pixels of the micro-LED display 100*b* is consist of the first LED subpixel 110, the second LED subpixel 120 and the third LED subpixel 130, and the other part of the pixels of the micro-LED display 100*b* is consist of the first LED subpixel 110, the second LED subpixel 120 and the fourth LED subpixel 140. Such arrangement can also generate the same image signal as the embodiment of FIG. 1 through the method of sub-pixel rendering of the algorithm of the control circuit.

Figure 9:
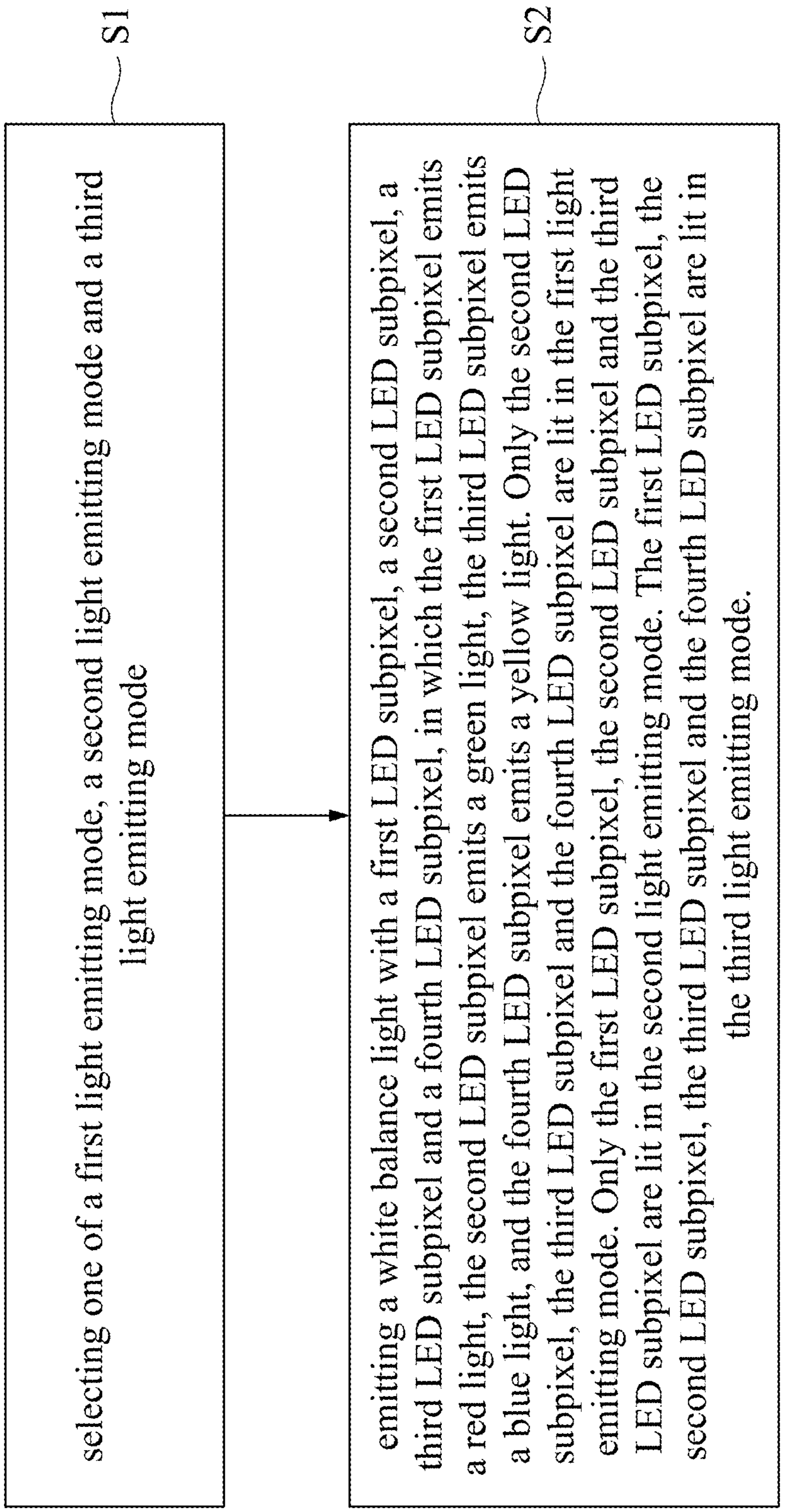
FIG. 9 is a flow chart of an operation method of the micro-LED display according to one embodiment of the present disclosure.

FIG. 9 is a flow chart of an operation method of the micro-LED display according to one embodiment of the present disclosure. Refer to FIG. 9, the operation method of a micro-LED display includes the following steps: in step S1, select one of a first light emitting mode, a second light emitting mode and a third light emitting mode. Thereafter, in step S2, emit a white balance light with a first LED subpixel, a second LED subpixel, a third LED subpixel and a fourth LED subpixel, in which the first LED subpixel emits a red light, the second LED subpixel emits a green light, the third LED subpixel emits a blue light, and the fourth LED subpixel emits a yellow light. Only the second LED subpixel, the third LED subpixel and the fourth LED subpixel are lit in the first light emitting mode. Only the first LED subpixel, the second LED subpixel and the third LED subpixel are lit in the second light emitting mode. The first LED subpixel, the second LED subpixel, the third LED subpixel and the fourth LED subpixel are lit in the third light emitting mode.

In some embodiments, the operation method of a micro-LED display is not limited to the steps S1 to S2 mentioned above. For example, each of the steps S1 and S2 can includes other detailed steps. In some embodiments, other steps can be further included between two steps of the steps S1 to S2, before step S1, or after step S2. In the following description, at least the above mentioned steps will be described in detail.

Refer to FIG. 1, using the embodiment of FIG. 1 as an example; first, select one of a first light emitting mode, a second light emitting mode and a third light emitting mode. As described above, the three light emitting modes will decide to light the first LED subpixel 110, the second LED subpixel 120, the third LED subpixel 130 or the fourth LED subpixel 140.

Thereafter, emit a white balance light with the first LED subpixel 110, the second LED subpixel 120, the third LED subpixel 130 and the fourth LED subpixel 140, in which the first LED 110 subpixel emits a red light, the second LED subpixel 120 emits a green light, the third LED subpixel 130 emits a blue light, and the fourth LED subpixel 140 emits a yellow light. Only the second LED subpixel 120, the third LED subpixel 130 and the fourth LED subpixel 140 are lit in the first light emitting mode. Only the first LED subpixel 110, the second LED subpixel 120 and the third LED subpixel 130 are lit in the second light emitting mode. The first LED subpixel 110, the second LED subpixel 120, the third LED subpixel 130 and the fourth LED subpixel 140 are lit in the third light emitting mode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A micro-light-emitting diode (LED) display, comprising:

a first LED subpixel configured to emit a red light;

a second LED subpixel configured to emit a green light;

a third LED subpixel configured to emit a blue light; and a fourth LED subpixel configured to emit a yellow light, wherein the yellow light emitted by the fourth LED subpixel has a peak wavelength that satisfies $\lambda_{p,Yellow,lower\_limit}<\lambda_p$, wherein $\lambda_{p,Yellow,lower\_limit}$ is a lower limit of the peak wavelength of the yellow light, $\lambda_p$ is the peak wavelength of the yellow light, the lower limit of the peak wavelength of the yellow light is a wavelength value of an intersection point of a connection line between a blue point and a white balance point and a spectral locus of an International Commission on Illumination (CIE) 1931 chromaticity diagram, wherein the blue point corresponds to the blue light emitted by the third LED subpixel, and a wavelength value of the intersection point is in a range of 560 nanometers to 580 nanometers.

2. The micro-LED display of claim 1, wherein the peak wavelength of the yellow light emitted by the fourth LED subpixel has an upper limit, and the upper limit is a peak wavelength of a red point on the CIE 1931 chromaticity diagram that corresponds to the red light emitted by the first LED subpixel.

3. The micro-LED display of claim 1, wherein the micro-LED display has a first light emitting mode, and only the second LED subpixel, the third LED subpixel and the fourth LED subpixel are lit in the first light emitting mode.

4. The micro-LED display of claim 1, wherein the micro-LED display has a second light emitting mode, and only the first LED subpixel, the second LED subpixel and the third LED subpixel are lit in the second light emitting mode.

5. The micro-LED display of claim 1, wherein the micro-LED display has a third light emitting mode, and the first LED subpixel, the second LED subpixel, the third LED subpixel and the fourth LED subpixel are lit in the third light emitting mode.

6. The micro-LED display of claim 3, wherein a first brightness of the fourth LED subpixel is greater than a second brightness of the second LED subpixel in the first light emitting mode.

7. The micro-LED display of claim 6, wherein the first brightness is greater than 1.5 times of the second brightness.

8. The micro-LED display of claim 6, wherein the first brightness of the fourth LED subpixel is greater than a third brightness of the third LED subpixel in the first light emitting mode.

9. The micro-LED display of claim 1, wherein a yellow point on the CIE 1931 chromaticity diagram that corresponds to the yellow light emitted by the fourth LED subpixel is located on a connection line between a red point and a green point on the CIE 1931 chromaticity diagram, wherein the red point corresponds to the red light emitted by the first LED subpixel, and the green point corresponds to the green light emitted by the second LED subpixel.

10. An operation method of a micro-LED display, comprising:

selecting one of a first light emitting mode, a second light emitting mode and a third light emitting mode; and emitting a white balance light with a first light-emitting diode (LED) subpixel, a second LED subpixel, a third LED subpixel and a fourth LED subpixel, wherein the first LED subpixel emits a red light, the second LED subpixel emits a green light, the third LED subpixel emits a blue light, the fourth LED subpixel emits a yellow light, only the second LED subpixel, the third LED subpixel and the fourth LED subpixel are lit in the first light emitting mode, only the first LED subpixel, the second LED subpixel and the third LED subpixel are lit in the second light emitting mode, and the first LED subpixel, the second LED subpixel, the third LED subpixel and the fourth LED subpixel are lit in the third light emitting mode.

11. The operation method of the micro-LED display of claim 10, wherein the yellow light emitted by the fourth LED subpixel has a peak wavelength that satisfies $\lambda_{p,\ Yellow,lower\_limit}<\lambda_p$, wherein $\lambda_{p,Yellow,lower\_limit}$ is a lower limit of the peak wavelength of the yellow light, $\lambda_p$ is the peak wavelength of the yellow light, the lower limit of the peak wavelength of the yellow light is a wavelength value of an intersection point of a connection line between a blue point and a white balance point and a spectral locus of an International Commission on Illumination (CIE) 1931 chromaticity diagram, wherein the blue point corresponds to the blue light emitted by the third LED subpixel, the white balance point corresponds to the white balance light, and a wavelength value of the intersection point is in a range of 560 nanometers to 580 nanometers.

12. The operation method of the micro-LED display of claim 11, wherein the peak wavelength has an upper limit, and the upper limit is a peak wavelength of a red point on the CIE 1931 chromaticity diagram that corresponds to the red light emitted by the first LED subpixel.

13. The operation method of the micro-LED display of claim 10, wherein a first brightness of the fourth LED subpixel is greater than a second brightness of the second LED subpixel.

14. The operation method of the micro-LED display of claim 13, wherein the first brightness is greater than 1.5 times of the second brightness.

15. The operation method of the micro-LED display of claim 10, wherein a first brightness of the fourth LED subpixel is greater than a third brightness of the third LED subpixel in the first light emitting mode.

* * * * *